US008724470B2

(12) United States Patent
Yi et al.

(10) Patent No.: US 8,724,470 B2
(45) Date of Patent: May 13, 2014

(54) METHOD OF CONTROLLING DATA FLOW IN WIRELESS COMMUNICATION SYSTEM

(75) Inventors: Seungjune Yi, Gyeonggi-Do (KR); Sungduck Chun, Gyeonggi-Do (KR); Sungjun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 13/388,935

(22) PCT Filed: Oct. 1, 2010

(86) PCT No.: PCT/KR2010/006732
§ 371 (c)(1),
(2), (4) Date: Feb. 3, 2012

(87) PCT Pub. No.: WO2011/040793
PCT Pub. Date: Apr. 7, 2011

(65) Prior Publication Data
US 2012/0127863 A1 May 24, 2012

Related U.S. Application Data

(60) Provisional application No. 61/247,940, filed on Oct. 1, 2009.

(30) Foreign Application Priority Data

Sep. 29, 2010 (KR) ........................ 10-2010-0094781

(51) Int. Cl.
*G01R 31/08* (2006.01)
*H04W 4/00* (2009.01)
(52) U.S. Cl.
USPC ............................ 370/235; 370/328; 370/329

(58) Field of Classification Search
CPC ....................................................... H04L 47/10
USPC ........................................ 370/329, 235, 328
See application file for complete search history.

(56) References Cited

U.S. PATENT DOCUMENTS

| 2002/0199008 | A1 | 12/2002 | Pecen et al. | |
|---|---|---|---|---|
| 2003/0214906 | A1 | 11/2003 | Hu et al. | |
| 2005/0083876 | A1* | 4/2005 | Vialen et al. | 370/328 |
| 2007/0036079 | A1* | 2/2007 | Chowdury et al. | 370/235 |
| 2008/0247389 | A1 | 10/2008 | Horn | |
| 2010/0260126 | A1* | 10/2010 | Ulupinar et al. | 370/329 |

FOREIGN PATENT DOCUMENTS

| CN | 101132370 A | 2/2008 |
|---|---|---|
| WO | WO 2009-058084 A1 | 5/2007 |
| WO | WO2009/090160 | 7/2009 |
| WO | WO2009/090582 | 7/2009 |

* cited by examiner

*Primary Examiner* — Ian N Moore
*Assistant Examiner* — Kiet Tang
(74) *Attorney, Agent, or Firm* — McKenna Long & Aldridge LLP

(57) ABSTRACT

Disclosed is a wireless communication system and a user equipment (UE) providing wireless communication services, and more particularly, a method of controlling data flow in an Evolved Universal Mobile Telecommunications System (E-UMTS), a Long Term Evolution (LTE) system, and a LTE-Advanced (LTE-A) system that have evolved from a Universal Mobile Telecommunications System (UMTS). In particular, the present invention provides an effective way of controlling data flow of a relay node (RN) in the LTE-A system.

12 Claims, 6 Drawing Sheets

METHOD OF CONTROLLING DATA FLOW IN WIRELESS COMMUNICATION SYSTEM

This application is a 35 U.S.C. §371 National Stage entry of International Application No. PCT/KR2010/006732, filed on Oct. 1, 2010, and claims the benefit to and of U.S. Provisional Application No. 61/247,940 filed on Oct. 1, 2009 and Korean Patent Application No. 10-2010-0094781 filed Sep. 29, 2010, all of which are incorporated by reference in their entirety herein.

TECHNICAL FIELD

The present invention relates to a wireless communication system and a user equipment (UE) providing wireless communication services, and more particularly, a method of controlling data flow in an Evolved Universal Mobile Telecommunications System (E-UMTS), a Long Term Evolution (LTE) system, and a LTE-Advanced (LTE-A) system that have evolved from a Universal Mobile Telecommunications System (UMTS).

BACKGROUND ART

The LTE system is a mobile communication system that has evolved from a UMTS system, and the standard has been established by 3rd Generation Partnership Project (3GPP), which is an international standardization organization.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjust a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a retransmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

In general, if a data flow of a particular network node is congested, such congestion is caused by a particular terminal (UE) or a particular radio bearer of the terminal. However, in a conventional art, the data flow of all terminals (or all radio bearers) in the particular network node is reduced or stopped. As such, data flow of other terminal (or a radio bearer of other terminal), which does not affect on the data flow congestion, is also reduced or stopped. And, this causes a great drawback in the conventional art, as data throughput in the particular network node can not be achieved in effective manner.

DISCLOSURE OF INVENTION

Solution to Problem

Accordingly, an object of the present invention is to provide a method of effectively controlling data flow of a network node within a wireless communication system.

In order to achieve the foregoing object, the present invention may propose a method of providing data in wireless communication system having a terminal, a relay node (RN) and a Doner eNB (DeNB), the method comprising: receiving a data flow control message from a relay node (RN), wherein the data flow control message includes an identifier of a terminal requiring a data flow control in the relay node; and controlling a data flow after receiving the data flow control message, wherein the data flow is controlled by adjusting data flow of at least one radio bearer (RB) used by the identified terminal.

Further, in order to achieve the foregoing object, the present invention may propose a method of providing data in wireless communication system having a terminal, a relay node (RN) and a Doner eNB (DeNB), the method comprising: receiving a data flow control message from a relay node (RN), wherein the data flow control message includes an identifier of a specific radio bearer (RB) and an identifier of a terminal using the specific radio bearer, wherein the specific radio bearer of the terminal requires a data flow control in the relay node (RN); and controlling a data flow after receiving the data flow control message, wherein the data flow is controlled by adjusting data flow of the specific radio bearer of the terminal.

Also, in order to achieve the foregoing object, the present invention may propose a method of providing data in wireless communication system having a terminal, a relay node (RN) and a Doner eNB (DeNB), the method comprising: detecting a condition of data flow of a specific terminal; and transmitting, to the DeNB, a data flow control message based on the detecting step, wherein the data flow control message includes an identifier of a terminal requiring a data flow control in the relay node.

Also, in order to achieve the foregoing object, the present invention may propose a method of providing data in wireless communication system having a terminal, a relay node and a Doner eNB, the method comprising: detecting a condition of data flow of a specific radio bearer of the terminal; and transmitting, to DeNB, a data flow control message based on the detecting step, wherein the data flow control message includes an identifier of the specific radio bearer (RB) and an identifier of the terminal using the specific radio bearer.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the construction and operation of preferred embodiments according to the present invention will be described with reference to the accompanying drawings.

Figure 1:
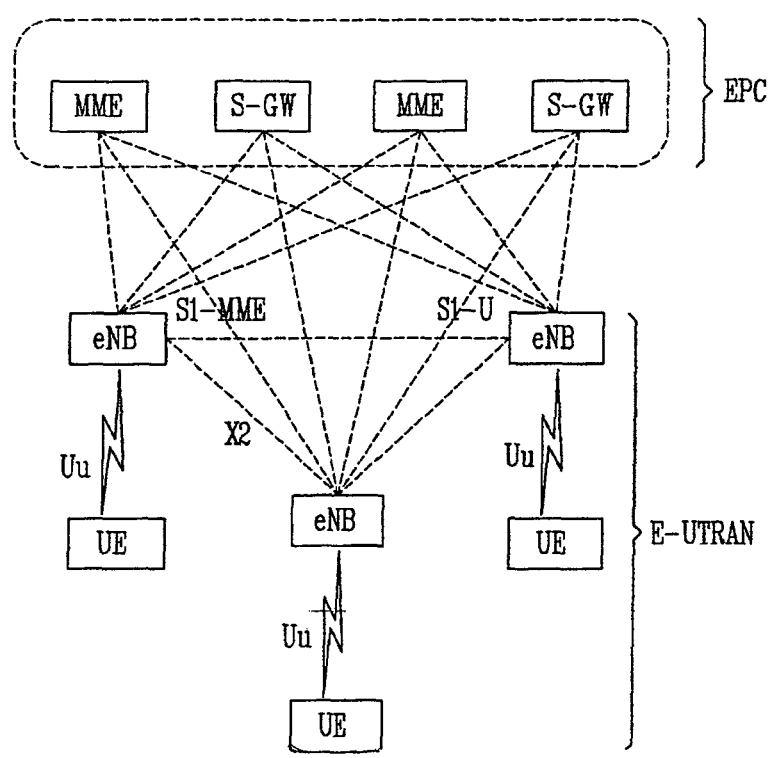
FIG. 1 is a view illustrating the network architecture of an LTE system, which is a mobile communication system to which the related art and the present invention are applied.
Figure 2:
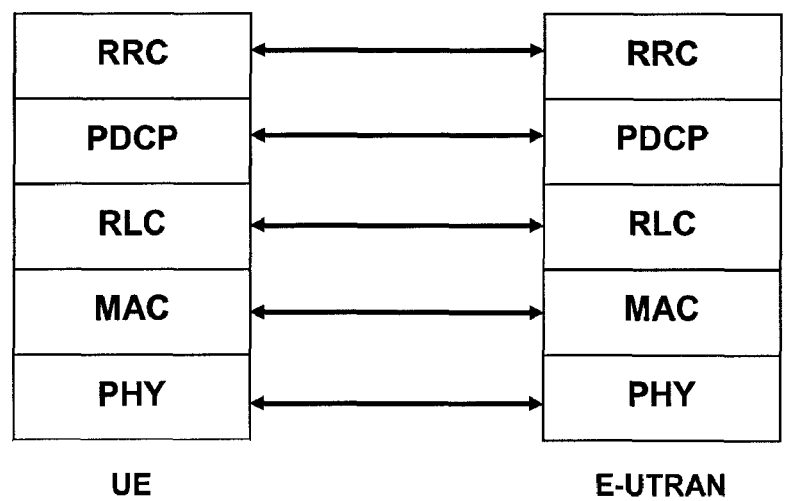
FIG. 2 is an exemplary view illustrating the control plane architecture of a radio interface protocol between UE and E-UTRAN in an LTE system, which is a mobile communication system to which the related art and the present invention are applied.
Figure 3:
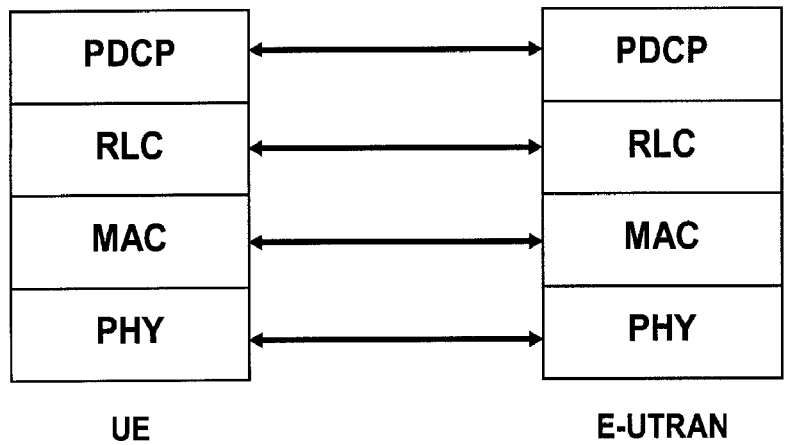
FIG. 3 is an exemplary view illustrating the user plane architecture of a radio interface protocol between UE and E-UTRAN in an LTE system, which is a mobile communication system to which the related art and the present invention are applied.
Figure 4:
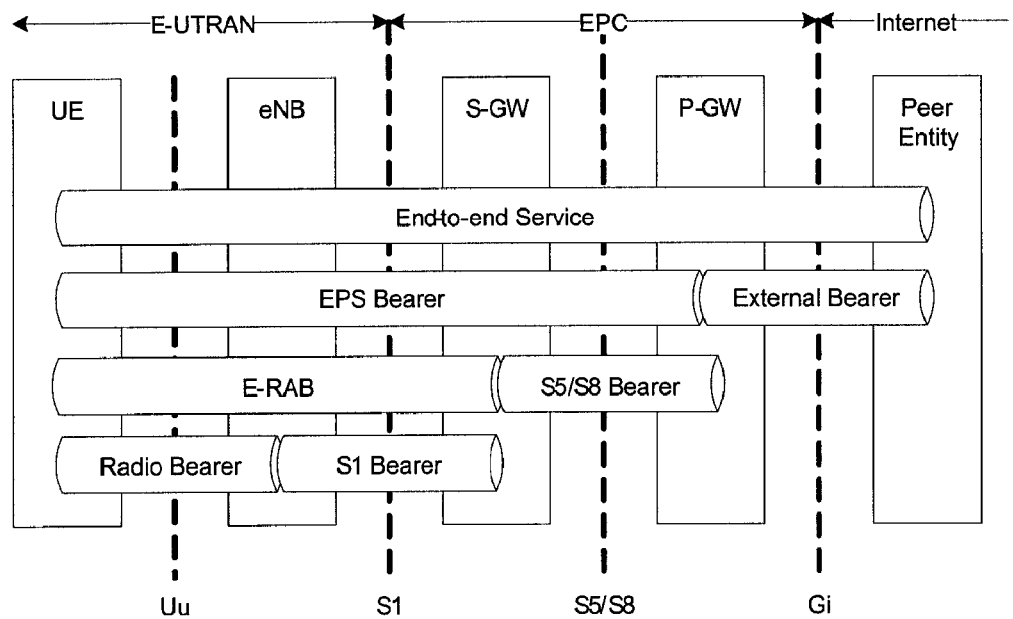
FIG. 4 is an exemplary view illustrating the bearer service structure of an LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between UE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like. Accordingly, QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union—Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
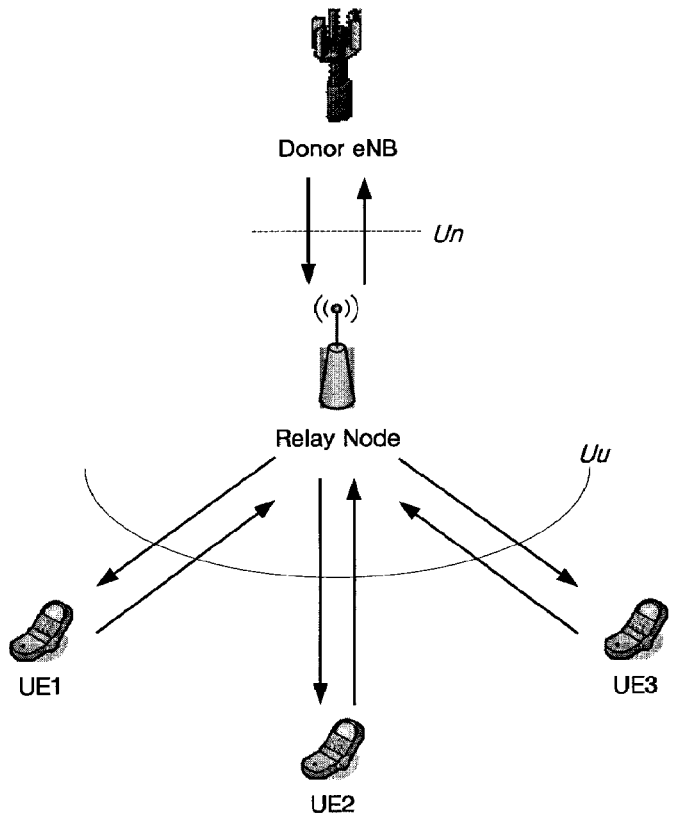
FIG. 5 is an exemplary view illustrating a relay node (RN) in an LTE-A system to which the present invention is applied.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, MAC/RLC/PDCP/RRC, which is an Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

In the LTE-Advanced system, a Relay Node is placed between two radio interfaces (i.e. Uu and Un). Since the two interfaces are independent (i.e. DeNB does not know the Uu situation, and UE does not know the Un situation), a flow control mechanism may be needed for the relay node. Specifically, for a downlink transmission to the UEs under the coverage of a relay node, the DeNB has to forward the data to the relay nodes. It needs to be ensured that the buffer in the relay node should be properly managed. (i.e. the buffer should not overflow nor should be emptied). For example, if the buffer in the relay node overflows, some packets are discarded, and if the buffer in the relay node is empty, the RN-UE link will be wasted. Thus, a flow control mechanism is needed between RN and DeNB, especially for a downlink transmission.

There are four potential interfaces that a flow control mechanism may be needed.

In an Uu interface, the relay node may act as an eNB to the UEs. Therefore, the relay node can know the UE's buffer status based on the buffer size information and a RLC (Radio Link Control) status report. Therefore, the relay node can control the amount of downlink (DL) data considering the UE's buffer status. Thus, No flow control mechanism may be needed in the DL-Uu interface.

A similar to the DL-Uu interface, no flow control mechanism may be needed in an UL-Uu interface. That is, the relay node can control the amount of uplink (UL) data by adjusting the UL grant. For example, if the relay node feels that a buffer is about to overflow, it can avoid buffer overflow by not assigning any UL grant to the UEs.

In an Un interface, the relay node may act as an UE to the DeNB (Doner eNB). Therefore, the DeNB can know the Un side buffer status of the relay node based on the buffer size information and the RLC status report. However, the DeNB cannot know the UE side buffer status of the relay node. If the DeNB keeps transmitting downlink (DL) data to the relay node while the relay node's Uu interface is congested, the downlink buffer in the relay node may overflow, which results in loss of packets. Thus, a flow control mechanism is needed for DL-Un interface to avoid any packet losses.

The relay node may send a BSR (buffer status report) to DeNB, and the DeNB can control the amount of uplink (UL) data from the relay node by adjusting the UL grant. Thus, a flow control mechanism may be not needed for UL-Un interface. However, considering that multiple Uu RBs could be multiplexed into a single Un RB, some changes might be needed in L2 functions, e.g. BSR transmission, to guarantee the required QoS of each RB.

Figure 6:
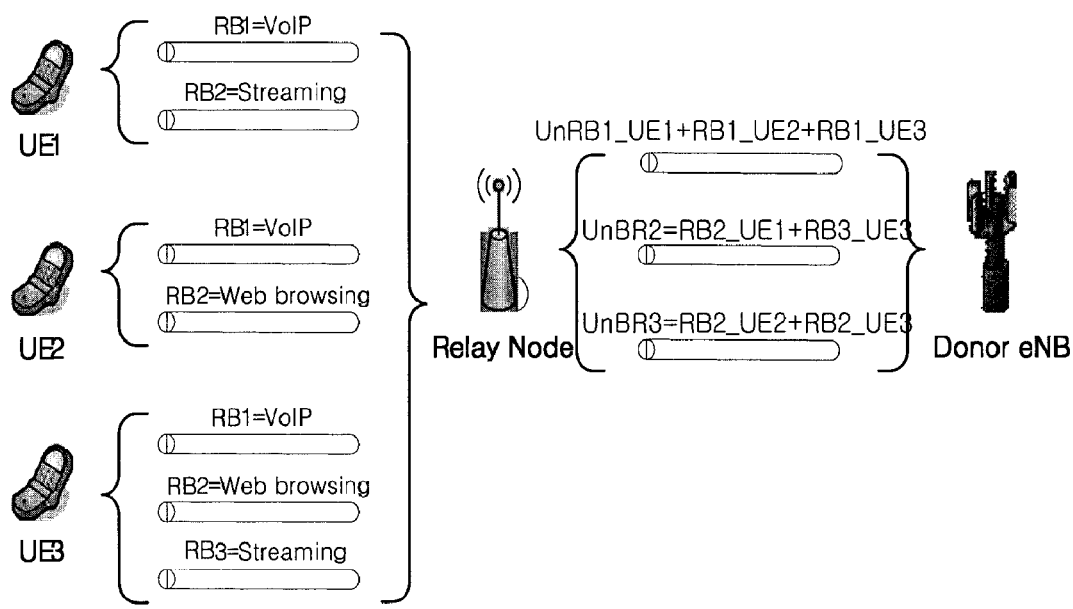
FIG. 6 is an exemplary view illustrating a Per-QoS bearer mapping method in an LTE-A system to which the present invention is applied.

FIG. 6 is an exemplary view illustrating a Per-QoS bearer mapping method in an LTE-A system to which the present invention is applied.

Radio bearers setting between a UE (user equipment) and RN (relay node) may be mapped to a particular UnRB based on an Quality of Service (QoS). That is, since a plurality of radio bearers is transmitted to a single UnRB after multiplexing, data transmitted through the UnRB may include an UE_ID for identifying the terminal (e.g., C-RNTI) and a RB_ID for identifying the radio bearer with respect to the terminal. Here, the UE_ID and RB_ID may be replaced with a GTP-ID.

The relay node may apply a data flow control with respect to an Un interface. As described above, since the two interfaces (i.e. Uu and Un) are independent in the LTE-A system, the eNB does not know a congested situation between the UE and RN. Therefore, if the eNB transmits a relatively large amount of data to the RN when the Uu interface is congested, there will be an overflow in a buffer of the RN, and some data will be discarded in the RN. In contrast, if the eNB transmits a relatively small amount of data to the RN when the Uu interface is not congested, the buffer of the RN can be empty, and the radio resource of the Uu interface will be wasted. Therefore, a data flow control should be applied between the RN and DeNB.

When the relay node (RN) requests a flow control to the eNB, an overall congested situation of the RN may be provided to the eNB. Also, a congested situation of Per-UnRB may also be provided to the eNB. If the overall congested situation of the RN is informed to the eNB, the eNB may reduce an amount of data for all UnRBs transmitted to the RN. If the congested situation of Per-UnRB is informed to the eNB, the eNB may reduce an amount of data only for those UnRB requesting the data flow control.

Figure 7:
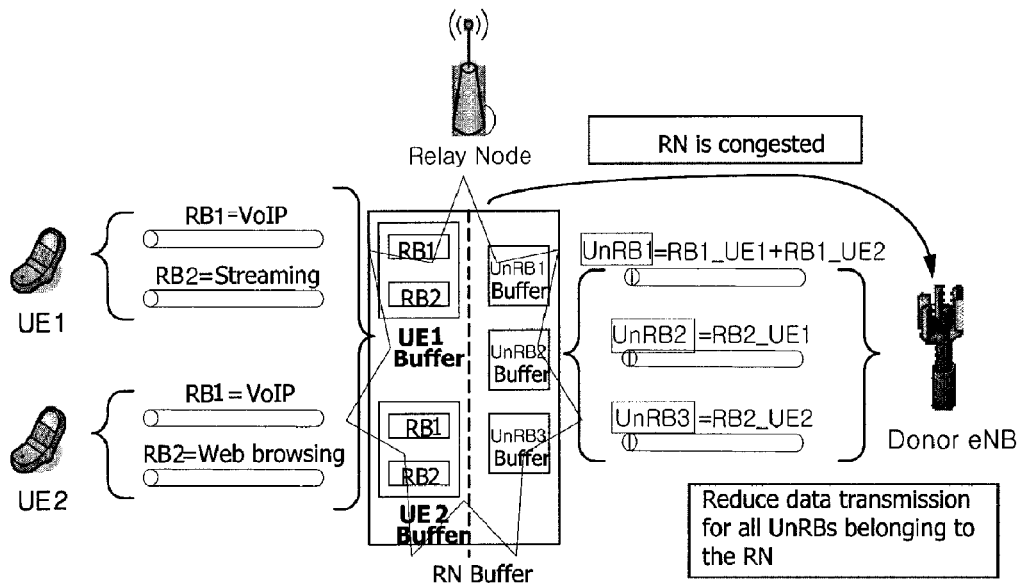
FIG. 7 is an exemplary view illustrating a Per-RN flow control method in an LTE-A system to which the present invention is applied.

FIG. 7 is an exemplary view illustrating a Per-RN flow control method in an LTE-A system to which the present invention is applied If the downlink (DL) buffer of RN is dynamically shared by all RBs, all RBs under the RN feel congestion in the overload situation. In this case, the DeNB may reduce traffic of all UnRBs transmitted to the RN. Since the congestion is indicated as a whole RN, only identification of RN is needed (either implicitly or explicitly) in the feedback message.

As shown in FIG. 7, if an amount of data handled by the RN is greater than a threshold value (i.e., when the RN is in congested), the RN may request to reduce or stop a data transmission for all UnRB belonged to the RN by transmitting a flow control message to a DeNB. Here, the flow control message may include information related to an overall congested situation happening in the RN.

Figure 8:
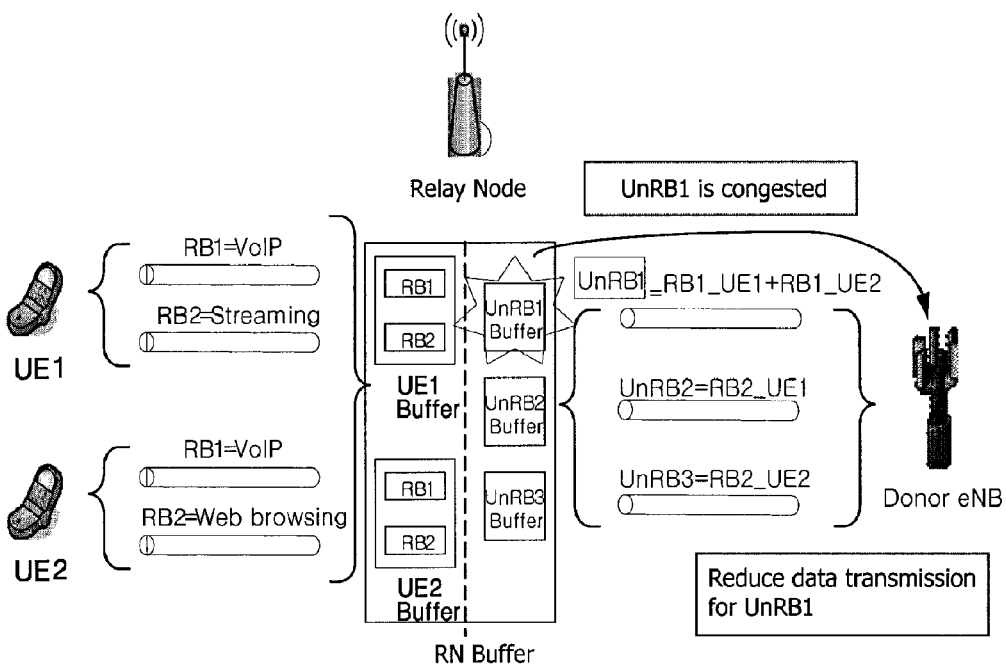
FIG. 8 is an exemplary view illustrating a Per-UnRB flow control method in an LTE-A system to which the present invention is applied.

FIG. 8 is an exemplary view illustrating a Per-UnRB flow control method in an LTE-A system to which the present invention is applied.

For a per QoS (Quality of Service) bearer mapping, it is possible that the relay node (RN) may manage downlink buffers per QoS of RBs. Since a QoS level is mapped to a single UnRB, flow control per QoS is same as flow control per UnRB. The feedback message may need to contain the ID of UnRB that suffers from congestion if the affected UnRB is not directly identified by the feedback message. When the DeNB receives a feedback message, the DeNB would reduce the traffic of RBs that are multiplexed in the UnRB.

As shown in FIG. 8, if the UnRB1 suffers from congestion, the RB1 of UE1 and the RB1 of UE2 are affected. Therefore, the DeNB may reduce or stop a data transmission for UnRB 1.

Figure 9:
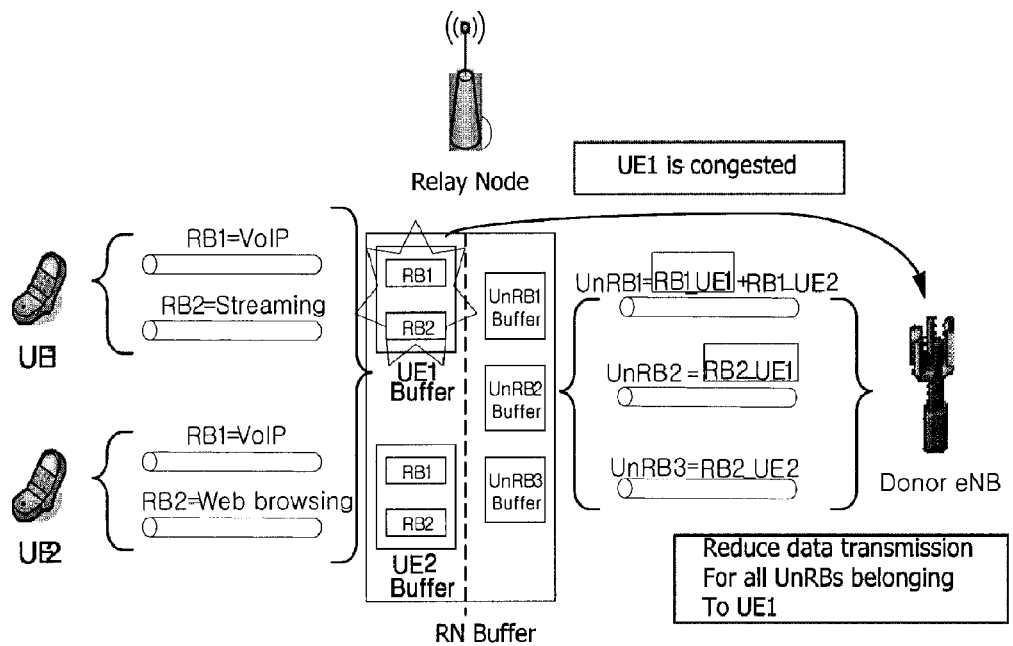
FIG. 9 is an exemplary view illustrating a Per-UE flow control method in an LTE-A system to which the present invention is applied.

FIG. 9 is an exemplary view illustrating a Per-UE flow control method in an LTE-A system to which the present invention is applied.

If the relay node (RN) manages DL buffer of UE side per UE, then the congestion could occur for a specific UE. The RN then may inform the DeNB that the UE is congested, and the DeNB would reduce the traffic of all RBs that belong to the UE. In the feedback message, only the UE ID may be included.

As shown in FIG. 9, if an amount of data handled by the RN is greater or smaller than a threshold value (i.e., when the RN is in congested or not in congested), the RN may request to reduce or increase a data transmission of radio bearer belonged to the UE by transmitting a flow control message to a DeNB. Here, the flow control message may include an identifier of UE that is congested. After receiving the flow control message from the RN, the DeNB may identify the UE and radio bearer(s) belonged to the UE. Then, the DeNB may control a data transmission for the radio bearers belonged to the UE. For example, the DeNB may reduce the data transmission for the radio bearers when the RN is congested. Thereafter, if the congestion of the RN is released (i.e., if an amount of data handled by the RN is below the threshold value), the RN may transmit a transmission restart message to the DeNB in order to restart or increase the data transmission for the radio bearers belonged to the UE. Here, the transmission restart message may include an identifier of UE that have been released from the congestion.

In FIG. 9, if UE1 is congested, the relay node transmit the flow control message to the DeNB to notify this, and then the DeNB reduces traffic of RB1 and RB2 of UE1 in the UnRB1 and UnRB2 after receiving the flow control message.

Figure 10:
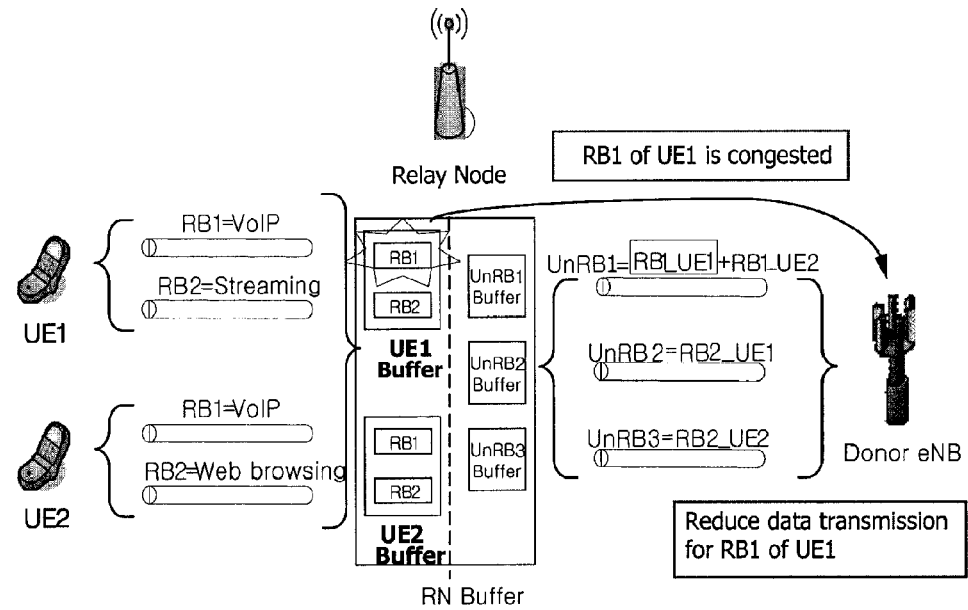
FIG. 10 is an exemplary view illustrating a Per-UuRB flow control method in an LTE-A system to which the present invention is applied.

FIG. 10 is an exemplary view illustrating a Per-UuRB flow control method in an LTE-A system to which the present invention is applied.

According to the present invention, the finest level of flow control may be a Per-Uu RB flow control. That is, the traffic is controlled per each RB (Radio Bearer) of UE (User Equipment). This type of flow control may be needed especially when the DL buffer of UE side in RN is managed per Uu_RB. For the RN to inform the DeNB that a specific Uu RB is congested, the RN may provide a UE_ID and a RB_ID in the feedback message.

As shown in FIG. 10, if an amount of data handled by the RN is greater or smaller than a threshold value (i.e., when the RN is in congested or not in congested), the RN may request to reduce or increase a data transmission of radio bearer of the UE by transmitting a flow control message to a DeNB. Here, the flow control message may include an identifier of UE that is congested. After receiving the flow control message from the RN, the DeNB may identify radio bearer(s) of the UE. Then, the DeNB may control a data transmission for the radio bearers of the UE. For example, the DeNB may reduce the data transmission for the radio bearers of the UE when the RN is congested. Thereafter, if the congestion of the RN is released (i.e., if an amount of data handled by the RN is below the threshold value), the RN may transmit a transmission restart message to the DeNB in order to restart or increase the data transmission for the radio bearers of the UE. Here, the transmission restart message may include an identifier of UE or a radio bearer of the UE that have been released from the congestion.

In FIG. 10, the UE side of RN (relay node) has DL buffers for each RB, and one of them (RB1 of UE1) suffers from congestion. In this case, the RN informs to DeNB through feedback message that RB1 of UE1 is congested. Then, the DeNB may reduce the traffic of RB1 of UE1 in the UnRB1.

The present disclosure may provide a method of providing data in wireless communication system having a terminal, a relay node (RN) and a Doner eNB (DeNB), the method comprising: receiving a data flow control message from a relay node (RN), wherein the data flow control message includes an identifier of a terminal requiring a data flow control in the relay node; and controlling a data flow after receiving the data flow control message, wherein the data flow is controlled by adjusting data flow of at least one radio bearer (RB) used by the identified terminal, wherein the data flow control message is generated by the RN when a total amount of data handling by the RN is greater than a threshold, the data flow control message is generated by the RN when a total amount of data handling by the RN is less than a threshold, the data flow is decreased if a data flow congestion is occurred, and the data flow is increased if an occurrence of the data flow congestion is released.

It can be also said that the present disclosure may provide a method of providing data in wireless communication system having a terminal, a relay node (RN) and a Doner eNB (DeNB), the method comprising: receiving a data flow control message from a relay node (RN), wherein the data flow control message includes an identifier of a specific radio bearer (RB) and an identifier of a terminal using the specific radio bearer, wherein the specific radio bearer of the terminal requires a data flow control in the relay node (RN); and controlling a data flow after receiving the data flow control message, wherein the data flow is controlled by adjusting data flow of the specific radio bearer of the terminal, wherein the data flow control message is generated by the RN when a total amount of data handling by the RN is greater than a threshold, the data flow control message is generated by the RN when a total amount of data handling by the RN is less than a threshold, the data flow is decreased if a data flow congestion is occurred, and the data flow is increased if an occurrence of the data flow congestion is released.

The present disclosure may also provide a method of providing data in wireless communication system having a terminal, a relay node (RN) and a Doner eNB (DeNB), the method comprising: detecting a condition of data flow of a specific terminal; and transmitting, to the DeNB, a data flow control message based on the detecting step, wherein the data flow control message includes an identifier of a terminal requiring a data flow control in the relay node.

It can be also said that the present disclosure may provide a method of providing data in wireless communication system having a terminal, a relay node and a Doner eNB, the method comprising: detecting a condition of data flow of a specific radio bearer of the terminal; and transmitting, to DeNB, a data flow control message based on the detecting step, wherein the data flow control message includes an identifier of the specific radio bearer (RB) and an identifier of the terminal using the specific radio bearer.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of providing data in a wireless communication system having a terminal, a relay node (RN) and a Donor eNB (DeNB), the method comprising:
   receiving a data flow control message from the relay node (RN), wherein the data flow control message includes an identifier of the terminal requiring a data flow control in the relay node; and
   controlling a data flow after receiving the data flow control message, wherein the data flow is controlled by adjusting data flow of at least one radio bearer (RB) used by the identified terminal,
   wherein the at least one radio bearer (RB) is a Un radio bearer over a Un interface between the RN and the DeNB, and
   wherein at least one of a plurality of Uu radio bearers is mapped to the Un radio bearer based on Quality of Services (QoSs) associated with the plurality of Uu radio bearers,
   wherein the plurality of Uu radio bearers are established over a Uu interface between the terminal and the RN.

2. The method of claim 1, wherein the data flow control message is generated by the RN when a total amount of data handling by the RN is greater than a threshold.

3. The method of claim 1, wherein the data flow control message is generated by the RN when a total amount of data handling by the RN is less than a threshold.

4. The method of claim 1, wherein the data flow is decreased if a data flow congestion is occurred.

5. The method of claim 4, wherein the data flow is increased if an occurrence of the data flow congestion is released.

6. A method of providing data in a wireless communication system having a terminal, a relay node (RN) and a Donor eNB (DeNB), the method comprising:

receiving a data flow control message from the relay node (RN), wherein the data flow control message includes an identifier of a specific radio bearer (RB) and an identifier of the terminal using the specific radio bearer, wherein the specific radio bearer of the terminal requires a data flow control in the relay node (RN); and controlling a data flow after receiving the data flow control message, wherein the data flow is controlled by adjusting data flow of the specific radio bearer of the terminal, wherein the specific radio bearer is a Un radio bearer over a Un interface between the RN and the DeNB, and wherein at least one of a plurality of Uu radio bearers is mapped to the specific radio bearer based on Quality of Services (QoSs) associated with the plurality of Uu radio bearers, wherein the plurality of Uu radio bearers are established over a Uu interface between the terminal and the RN.

7. The method of claim 6, wherein the data flow control message is generated by the RN when a total amount of data handling by the RN is greater than a threshold.

8. The method of claim 6, wherein the data flow control message is generated by the RN when a total amount of data handling by the RN is less than a threshold.

9. The method of claim 6, wherein the data flow is decreased if a data flow congestion is occurred.

10. The method of claim 7, wherein the data flow is increased if an occurrence of the data flow congestion is released.

11. A method of providing data in a wireless communication system having a terminal, a relay node (RN) and a Donor eNB (DeNB), the method comprising:

detecting a condition of data flow of a specific terminal; and transmitting, to the DeNB, a data flow control message based on the detecting step, wherein the data flow control message includes an identifier of the terminal requiring a data flow control in the relay node, wherein the data flow is controlled by adjusting data flow of at least one radio bearer (RB) used by the identified terminal, wherein the at least one radio bearer (RB) is a Un radio bearer over a Un interface between the RN and the DeNB, and wherein at least one of a plurality of Uu radio bearers is mapped to the Un radio bearer based on Quality of Services (QoSs) associated with the plurality of Uu radio bearers, wherein the plurality of Uu radio bearers are established over a Uu interface between the terminal and the RN.

12. A method of providing data in a wireless communication system having a terminal, a relay node and a Donor eNB, the method comprising:

detecting a condition of data flow of a specific radio bearer of the terminal; and transmitting, to the DeNB, a data flow control message based on the detecting step, wherein the data flow control message includes an identifier of the specific radio bearer (RB) and an identifier of the terminal using the specific radio bearer, wherein the data flow is controlled by adjusting data flow of the specific radio bearer of the terminal, wherein the specific radio bearer is a Un radio bearer over a Un interface between the RN and the DeNB, and wherein at least one of a plurality of Uu radio bearers is mapped to the specific radio bearer based on Quality of Services (QoSs) associated with the plurality of Uu radio bearers, wherein the plurality of Uu radio bearers are established over a Uu interface between the terminal and the RN.

\* \* \* \* \*